(No Model.) 2 Sheets—Sheet 1.
F. J. MILLER.
TRANSIT INSTRUMENT.
No. 360,321. Patented Mar. 29, 1887.
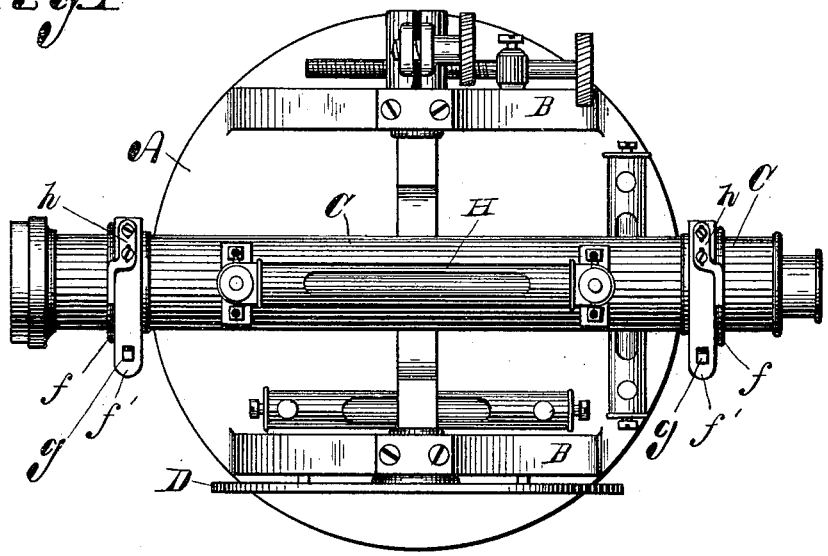
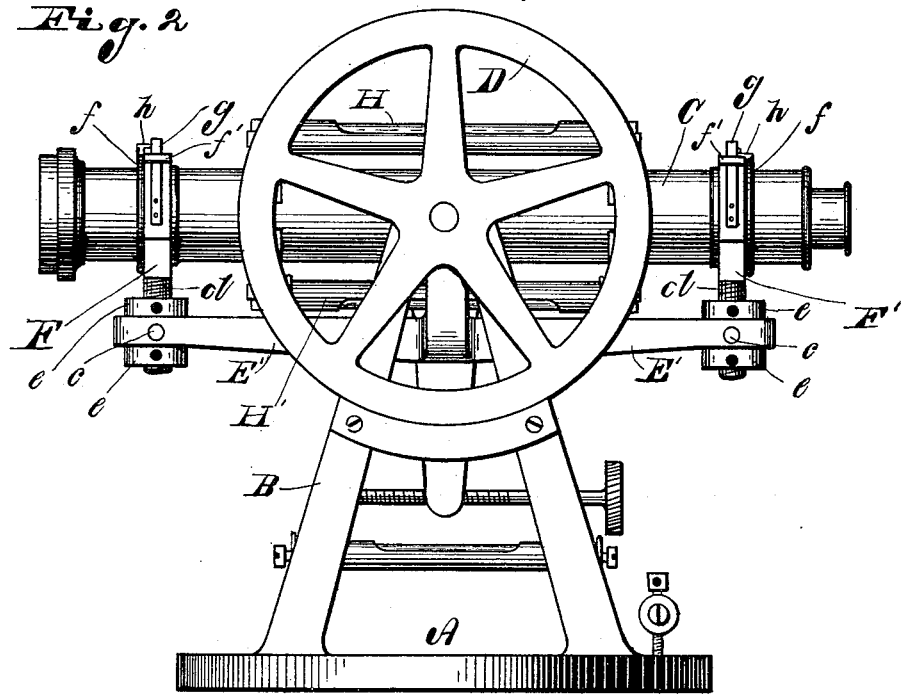

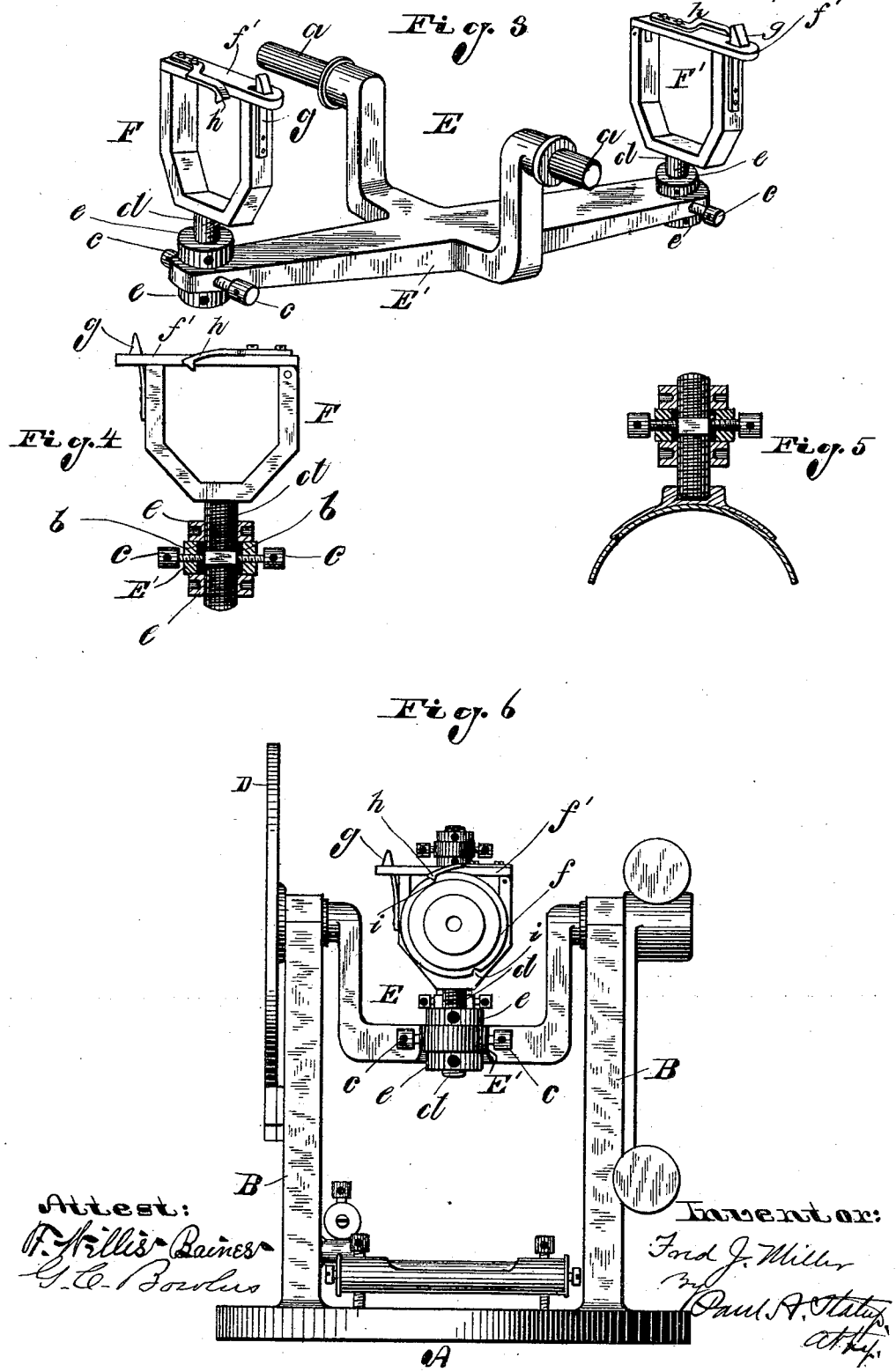

UNITED STATES PATENT OFFICE.

FRED. J. MILLER, OF SPRINGFIELD, OHIO.

TRANSIT-INSTRUMENT.

SPECIFICATION forming part of Letters Patent No. 360,321, dated March 29, 1887.

Application filed May 7, 1886. Serial No. 201,455. (No model.)

*To all whom it may concern:*

Be it known that I, FRED. J. MILLER, a citizen of the United States, residing at Springfield, in the county of Clark and State of Ohio, have invented certain new and useful Improvements in Transit-Instruments, of which the following is a specification.

My invention relates to improvements in transit-instruments, and also relates in its nature to Y-levels.

The objects of the invention are, first, to provide a single instrument possessing all the advantages and capable of performing all the functions both of an ordinary transit-instrument and an ordinary engineer's Y-level; second, to provide a transit-instrument in which certain adjustments, which, in the ordinary transit, depend on the accuracy of the manufacture thereof, may be readily tested, and, if in error, corrected.

My invention consists, first, in supporting the telescope of a transit-instrument in such a manner that it will be capable of an adjustment relative to the horizontal axis of revolution, whereby the line of collimation may be accurately adjusted to pass through the horizontal axis of revolution and perpendicular thereto.

It further consists in a revolving support for the telescope, provided with adjustable Y-bearings, in which the telescope is adapted to rotate, its axis of collimation being adapted to stand perpendicular to and intersect the horizontal axis of revolution of the said support.

It further consists in various constructions and combinations of parts, hereinafter described, and pointed out in the claims.

In the accompanying drawings, Figure 1 is a plan view of an instrument embodying my invention. Fig. 2 is a side-elevation view of the same. Fig. 3 is a perspective view of the support in detail. Figs. 4 and 5 are detailed views, referred to hereinafter; and Fig. 6 is an end-elevation view showing the revolving support and telescope in position in the instrument.

In the said drawings, A represents the upper horizontal plate of an ordinary transit, the lower plate and tripod-head being omitted in the drawings, as they do not form any part of the present invention.

The plate A is supplied with the customary compass, levels, graduations, and verniers, and is provided with the standards B B, which are adapted to support the telescope C.

D represents the vertical circle, which is secured to the trunnion on which the telescope is adapted to revolve in altitude, and is perpendicular to the horizontal axis of revolution. It is provided with the customary graduations and vernier. (Not shown in the drawings.)

In transit-instruments as heretofore generally constructed the pivots or trunnions which support the telescope and on which it is adapted to turn in altitude have been secured rigidly to the telescope, the said trunnions being so constructed that the axis thereof is adapted to intersect the line of collimation of the telescope at right angles thereto. By this construction it was necessary that the adjustment of the horizontal axis of revolution in relation to the line of collimation of the telescope be performed in the manufacture, and no means were provided for changing the adjustment to correct an error in case it should be discovered. It was also difficult by this construction to perform the various adjustments necessary to assure the accuracy of the instrument and readily test the same for error in cases where absolute precision is desired. For this reason it is customary for engineers to provide themselves with both a Y-level and a transit-instrument.

In my improved instrument I support the telescope on an independent supporting-piece, E, which is preferably provided with a U-shaped cross-bar having its upper extremities extended at right angles and turned off to form trunnions *a a*, which are journaled in the standards B B in the usual manner. The lower portion or base, E', of the supporting-piece E consists, preferably, of a straight bar intersecting the cross-arm at its base and at right angles thereto. In either end of the base E' of the supporting-piece E, I provide small slotted openings *b*, into which project, from either side thereof, small adjusting-screws *c c*.

Supported on the base E', at the respective ends thereof, are Y-bearings F F', the standards or studs *d* of which are adapted to pass through the slotted openings *b b*, and be moved laterally therein by the adjusting-screws *c c*. The Y-bearings are also adapted to be adjusted vertically through the base E', preferably by making the standards d screw-threaded and provided at either side of the base-bar E' with an adjusting-nut, e. (See Fig. 4 for detail.)

The Y-bearings are preferably constructed in the ordinary manner, and are adapted to form a bearing at either end of the telescope, the telescope being provided with the usual bearing-rings, adapted to rest on the bearing-faces of the Y's, and provided with flanges $f f$, to hold it against longitudinal movement through the Y's.

The Y's are closed at the top by a bar, $f'$, hinged at one end, and adapted to be engaged at the other end by a small spring-latch, $g$. By this construction the telescope may be readily revolved on its axis, or may be removed and turned end for end in its bearings, after the usual manner of an ordinary Y-level.

To provide for holding the telescope at the proper point, so that the cross-wires shall stand on a vertical and horizontal line, respectively, I place on each of the Y-bearings a small spring-catch, $h$, secured thereto in any convenient position by small screws passing through slotted openings in the said catches. In one of the flanges $f$, at one end of the telescope only, I provide two small notches, $i$, (one hundred and eighty degrees from each other,) with which the catch $h$ is adapted to engage when the cross-wires are in the proper position. There being notches at one end only of the telescope, but one of the spring-catches is in use at any one time, each catch being adapted to engage the same notches when the telescope is reversed in the Y's. The spring-catches, being provided with slotted openings, may readily be adjusted to bring the cross-wires exactly vertical and horizontal when in either notch, and to correct any error which may occur.

I preferably provide the telescope with two levels, H and H', one on either side thereof, each of said levels being provided at either end with means for vertical and lateral adjustment, in substantially the same manner as above described for the Y-bearings, and as shown in Fig. 5. By this construction I am enabled to readily use the telescope with either side up.

It will be seen that by the construction above described I provide an instrument capable of all the adjustments and adapted to perform all the functions of both an ordinary transit and a Y-level. In addition to these adjustments the line of collimation may be readily adjusted in relation to the horizontal axis of revolution by adjusting the Y's in the revolving supporting-piece by means of the screws $c c$ and nuts $e e$. As a combined instrument it takes the place of both a transit and a Y-level, and as a transit it has many advantages over the transits heretofore used. Being mounted in Y's, the telescope may be reversed for taking a back sight without transiting the instrument. It may also be revolved on its axis, so that either side will be brought upward, thus obviating unequal expansion and detecting errors resulting therefrom in cases where the sun shines almost continuously on one side of the telescope.

I have shown the constructions which I prefer to use in carrying out my invention; but it is obvious that these constructions may be variously modified, if desired, and still accomplish the same result.

Having thus described my invention, I claim—

1. In a transit-instrument, a telescope adapted to be revolved on a horizontal axis of revolution, said telescope being supported adjustably in relation to the horizontal axis of revolution in such a manner that its line of collimation may intersect said axis of revolution and be adjustable relative thereto, substantially as set forth.

2. The combination, with a telescope for a transit-instrument, of a pivoted support having independent bearings to support the telescope, and means for adjusting said telescopic bearings, so that the axis thereof may intersect the axis of the pivotal bearings and be adjustable relative thereto, substantially as and for the purpose set forth.

3. A vertically-revolving support for a telescope provided with adjustable Y-bearings in which the telescope is adapted to rotate, the axis of collimation of said telescope being adapted to intersect the horizontal axis of revolution of said support, substantially as set forth.

4. The combination, with the telescope, of the pivoted support provided at either end with Y-bearings in which the telescope is adapted to be supported with its line of collimation crossing the axis of said support, and means for adjusting said Y-bearings vertically and laterally, substantially as specified.

5. The combination, with the telescope, of the pivoted support having the U-shaped cross-piece with the trunnions thereon and the longitudinal base intersecting said cross-piece at the bottom and provided at each end with slotted openings, Y-bearings in said slotted openings, and the vertical and lateral adjusting-screws for operating said bearings, substantially as set forth.

6. The combination, with the supporting-piece provided with the longitudinal base and the U-shaped cross-bar having projecting trunnions, of the Y-bearings on either end of said base-piece, a telescope in said Y's, a spring-catch for holding said telescope from revolution in said Y's, and means for adjusting said Y's vertically and laterally on said base, substantially as and for the purpose specified.

In testimony whereof I have hereunto set my hand this 3d day of May, A. D. 1886.

FRED. J. MILLER.

Witnesses:
AL. H. KUNKLE,
PAUL A. STALEY.